United States Patent [19]
Rich

[11] Patent Number: 6,070,825
[45] Date of Patent: Jun. 6, 2000

[54] FOREARM CASTING DEVICE

[76] Inventor: John Francis Rich, 13 Monklfy's Road, Millers forest NSW 2324, Australia

[21] Appl. No.: 09/154,913

[22] Filed: Sep. 17, 1998

Related U.S. Application Data

[63] Continuation of application No. PCT/AU97/00670, Oct. 7, 1997.

[30] Foreign Application Priority Data

| Oct. 9, 1996 | [AU] | Australia | 2861 |
| Jun. 16, 1997 | [AU] | Australia | 7357 |

[51] Int. Cl.$^7$ ..................................................... A01K 89/01
[52] U.S. Cl. ......................... 242/404.1; 242/236; 242/405
[58] Field of Search .................. 242/404.1, 405, 242/404, 235, 236, 240

[56] References Cited

U.S. PATENT DOCUMENTS

| 2,615,649 | 10/1952 | Flewelling | 242/404.1 |
| 2,855,717 | 10/1958 | Heil . | |
| 3,044,732 | 7/1962 | Simonds | 242/404.1 |
| 3,438,594 | 4/1969 | Bellefueille . | |
| 3,532,290 | 10/1970 | Sutz | 242/404.1 |
| 3,907,236 | 9/1975 | Sims, Jr. | 242/404.1 |
| 4,027,419 | 6/1977 | Popeil | 43/18 R |
| 4,082,235 | 4/1978 | Dauvergne . | |
| 4,887,777 | 12/1989 | Rasmussen | 242/404.1 |
| 5,323,986 | 6/1994 | Takeuchi | 242/240 |
| 5,358,158 | 10/1994 | Darr | 242/404.1 |
| 5,493,807 | 2/1996 | Sullins | 43/19 |

FOREIGN PATENT DOCUMENTS

| 161545 | 7/1953 | Australia . |
| 1452687 | 10/1976 | United Kingdom . |

*Primary Examiner*—Katherine A. Matecki
*Attorney, Agent, or Firm*—Ladas & Parry

[57] ABSTRACT

A forearm casting device has a body, a closed face fishing reel secured to the body towards a first end thereof and a spool for winding fishing line. A hood is located over the spool. A line guide pin is displaceable between a retracted position substantially within the hood and a protruding position protruding from the hood for guiding the fishing line onto the spool. A reel release displaces the line guide pin between the protruding and retracted positions. A guide for guiding the fishing line onto and off the closed face fishing reel is mounted towards an opposite end of the body. The body is secured to a forearm of an operator so the fishing line extends generally parallel to the forearm towards a hand of the operator and the forefinger of the hand is able to engage the fishing line forward of the guide.

16 Claims, 4 Drawing Sheets

FOREARM CASTING DEVICE

This application is a continuation of International Application PCT/AU/00670, filed on Oct. 7, 1997 and which designated the United States.

TECHNICAL FIELD

The present invention relates to fishing tackle and in particular relates to a casting device adapted to be secured to the forearm.

BACKGROUND OF THE INVENTION

Conventional fishing devices typically comprise either a simple hand held reel or a reel attached to a fishing rod. Hand held reels require some skill to cast effectively with as the reel must be held at a particular orientation to allow the fishing line to unspool freely from the reel. Manual retrieval of the line is also difficult, often resulting in tangling of the line. Fishing rods, whilst eliminating some of the difficulties associated with casting and retrieval using hand held reels are typically bulky. Both hand held reels and fishing rods usually require constant vigilance and need to be hand held whilst fishing.

OBJECT OF THE INVENTION

It is the object of the present invention to provide a forearm casting device.

SUMMARY OF THE INVENTION

In a broad form the present invention provides a forearm casting device having:
 a body,
 a closed face type fishing reel secured to said body and having a spool, a hood located over said spool and a line guide pin adapted to pass between a retracted position substantially within said hood and a protruding position protruding from said hood for guiding said fishing line onto said spool,
 securing means for securing said body to a forearm of an operator,
 a guide for guiding fishing line onto and off said fishing reel.

Typically said fishing reel is secured towards a first end of said body and said guide is located towards a second end of said body such that, in use, said fishing line extends from said fishing reel generally parallel to said forearm towards a hand of said operator.

The casting device may further have a cover adapted to substantially enclose said closed face type reel.

Preferably, in use, said fishing line extends through a cavity defined by said body and said cover, said guide being an eyelet communicating said cavity to outside said body and cover.

The cover and a portion of said body adjacent to said hood may functionally replace a closure member normally provided with closed face type reels by defining an annular space with said hood in which said line guide pin travels as said hood rotates, said cover and adjacent body portion preventing said fishing line from slipping over a free end of said line guide pin when said line guide pin is in said protruding position.

The fishing reel may include a closure member substantially enclosing said hood, said closure member defining an annular space with said hood in which said guide pin travels as said hood rotates, said closure member preventing said fishing line from slipping over a free end of said line guide pin when said line guide pin is in said protruding position, said closure member having an aperture in an end face thereof through which, in use, said fishing line extends.

Preferably a handle is provided at said second end of said body for gripping by said hand, The handle may be detachable and adjustable in position. The handle may also be hollow and act as said guide.

Preferable said securing means comprises at least one strap secured at opposing ends to said body and adapted to pass around said forearm. The securing means may comprise extensions of opposing sides of said body which are adapted to partially wrap around said forearm.

The reel can be reversed to allow either clockwise or anti clockwise operation of a handle thereof, and may employ a drag system.

Preferably the body is padded on an underside thereof adapted to abut said forearm.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
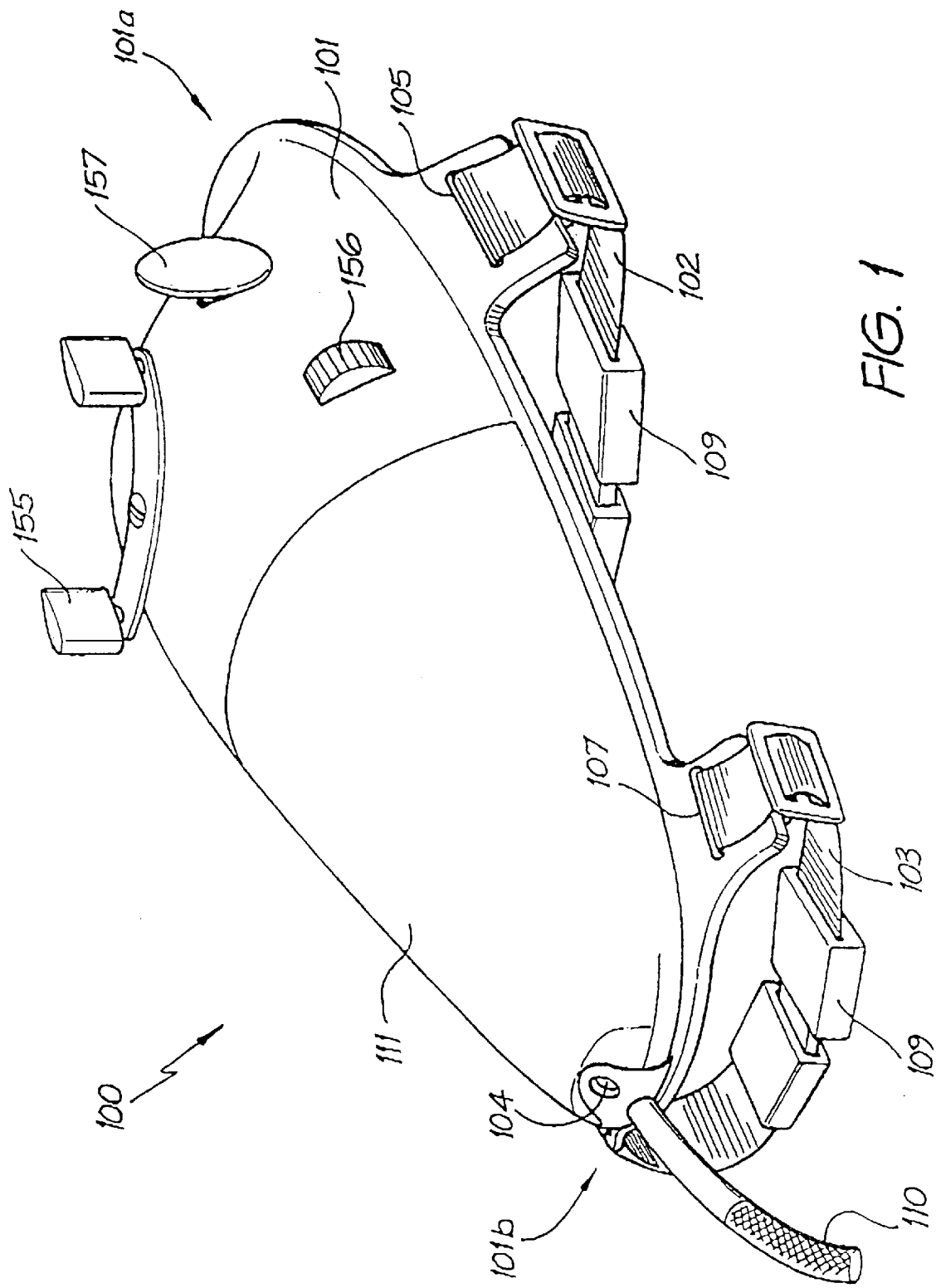
FIG. 1 is a perspective view of a forearm casting device according to a first embodiment of the present invention.
Figure 2:
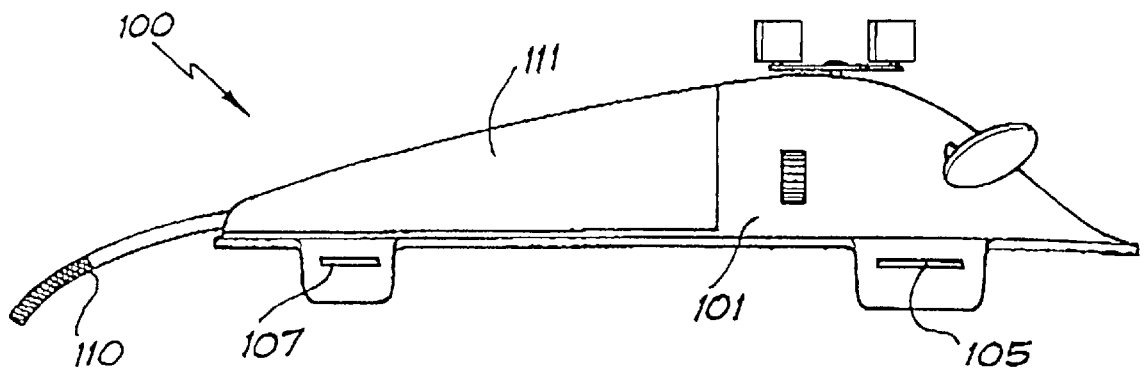
FIG. 2 is a side elevation view of the forearm casting device of FIG. 1 without securing straps.
Figure 3:
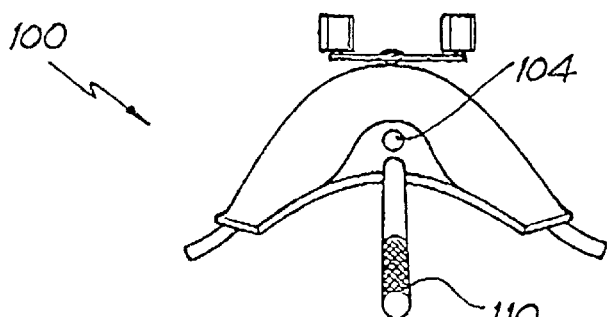
FIG. 3 is a front elevation view of the forearm casting device of FIG. 2.
Figure 4:
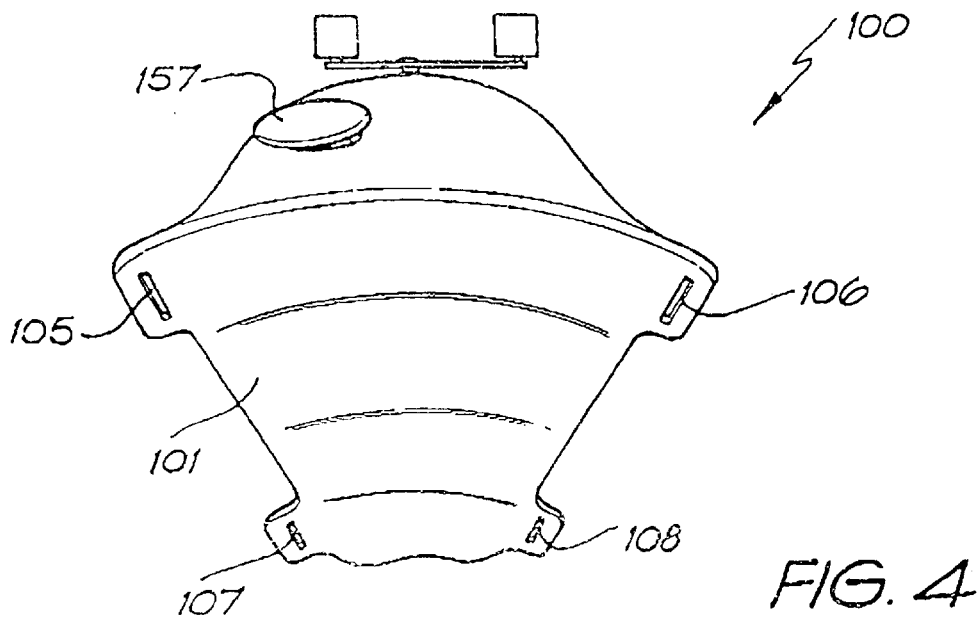
FIG. 4 is a perspective view from underneath the rear of the forearm casting device of FIG. 2.

The forearm casting device 100 of the first embodiment as depicted in FIGS. 1 to 6 has a body 101 adapted to receive a fishing reel 150. In this embodiment the fishing reel 150 is in the form of a closed face type fishing reel 150 which is depicted mounted in the body 101. The forearm casting device 100 would typically be supplied with the closed face type fishing reel 150 already mounted, but may also be supplied separately for the owner to mount a standard reel after purchase. Securing means are provided for securing the body 101 to the forearm of an operator, the securing means here taking the form of first and second straps 102, 103 secured at opposing ends to the body 101 and adapted to pass around the operator's forearm. Alternatively a single wider strap may be provided.

The closed face fishing reel 150 is here received in the body 101 towards a first end 101a thereof. An eyelet 104, for guiding fishing line 151 onto and off the closed face fishing reel 150, is secured toward a second end 101b of the body 101. This arrangement results in fishing line 151 extending from the fishing reel 150, which in use is positioned on the upper forearm of the operator, generally parallel to the forearm towards the operator's hand.

The first and second straps 102, 103 are secured to the body 101 through slots 105, 106, 107 and 108 provided on tabs extending from the sides of the body 101 at the first and second ends 101a, 101b thereof. The straps 102, 103 may be fastened around the forearm using standard fastenings such as pronged clip fasteners 109, as depicted in FIG. 1, or hook and loop fastening tape such as Velcro®. The straps 102, 103 should be adjustable to allow securing to various sized forearms. Alternatively the body 101 may be secured to the forearm by other means such as an elasticised sleeve. As a farther possible alternative, opposing sides of the body 101 may extend to partially wrap around the operator's forearm, so that the body 101 is essentially clipped onto the forearm.

The underside of the body 101 is concave so that it will generally follow the contour of the forearm and is padded to increase the comfort of the operator.

A handle 110 may be provided at the second end 101b of the body 101 which extends generally forwardly of the body 101. The handle 110 can be gripped by the hand of the operator on the arm to which the body 101 is secured. Utilising the grip stabilises the casting device 100 when fighting and bringing in a large fish. Gripping the handle 110 reduces the load on the straps 102, 103 or other securing means and reduces any possible discomfort caused by the straps 102, 103 rubbing on the forearm as a fish pulls against the casting device 100. The handle 110 is preferably detachable and adjustable in position to cater for preferred configurations of different operators. The handle 110 may be bent in a dog leg fashion such that the end of the handle extends at an angle to the forearm to facilitate an improved grip. Such a handle can preferably be detached from the body 101 and reattached by a snap-on fitting with the end of the handle extending in the opposite direction so that it may be utilised by left or right handers. The end of the handle 110 may be provided with a moulded grip to increase the comfort and grip available.

A further eyelet 112 may be secured to the body 101 between the eyelet 104 and reel 150 to further guide the fishing line 151 onto and off the reel 150.

Figure 5:
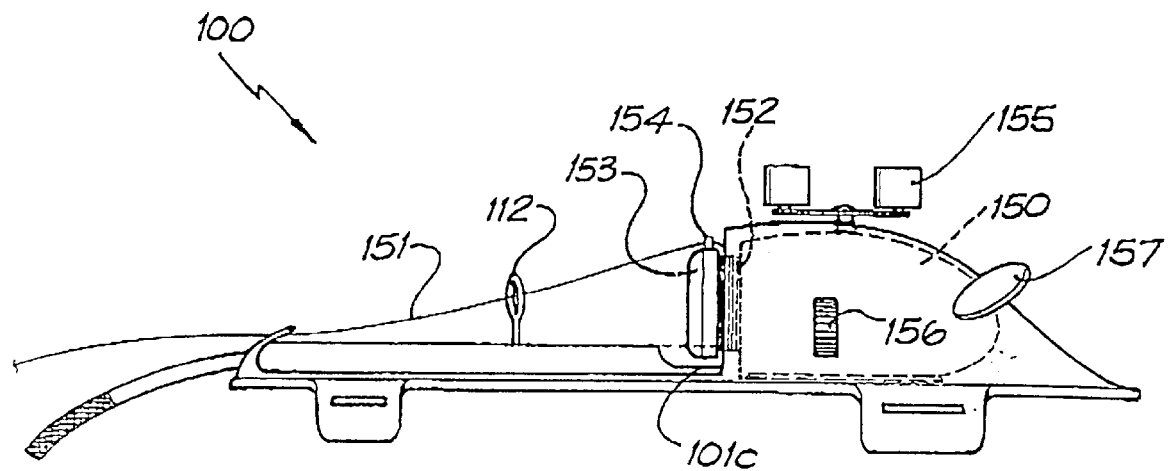
FIG. 5 is a side elevation view of the forearm casting device of FIG. 2 with the cover removed.
Figure 6:
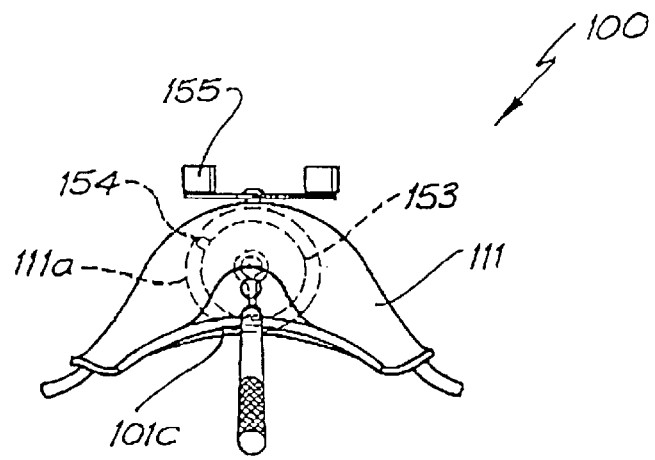
FIG. 6 is a front elevation view of the forearm casting device of FIG. 2 including hidden detail of the reel hood and cover.

Closed face type fishing reels 150 have a spool 152, a hood 153 located over the spool 152 and a line guide pin 154. The line guide pin 154 acts as the equivalent of the bail arm line guide of an open face reel and passes between a retracted position where the line guide pin 154 is substantially within the hood 153 and a protruding position as shown in FIGS. 5 and 6 where the line guide pin 154 protrudes from the hood 153. When the reel is wound by the handle 155 with the line guide pin 154 in the protruding position, the line guide pin 154 catches on the fishing line 151 and acts to guide the fishing line 151 onto the spool 152. In a regular fishing rod installation a closure member 159 encloses the hood 153 and provides an annular space around the hood 153 in which the line guide pin 154 travels as the hood 153 rotates on winding of the handle 155, with the closure member 159 closely surrounding the locus of movement of the free end of the line guide pin 154 such that the fishing line 151 is prevented from slipping over the free end of the line guide pin 154 when it is in its protruding position. The fishing line 151 extends out of the closure member 159 through an aperture 160 provided in the centre of its end face 161.

Figure 7:
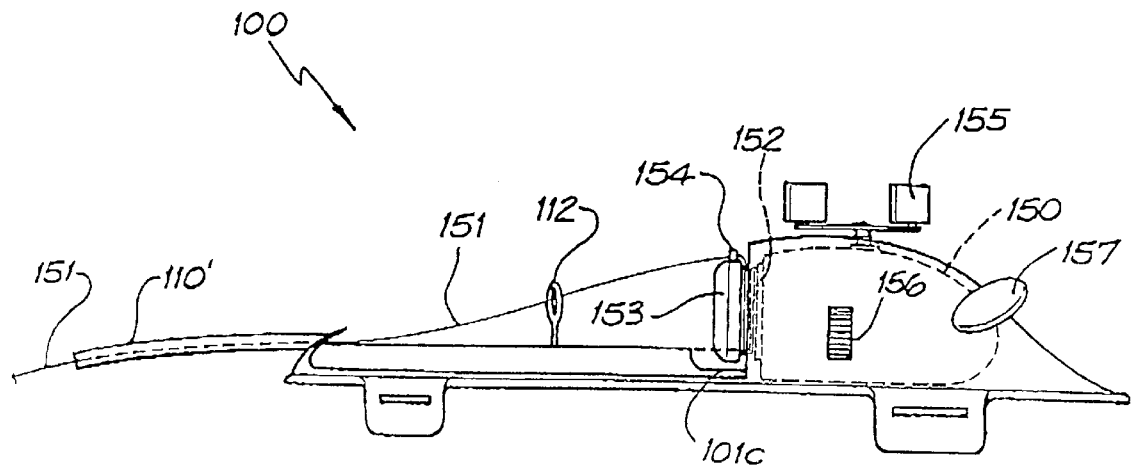
FIG. 7 is a side elevation view of a modified form of the forearm casting device of the first embodiment with the cover removed.
Figure 8:
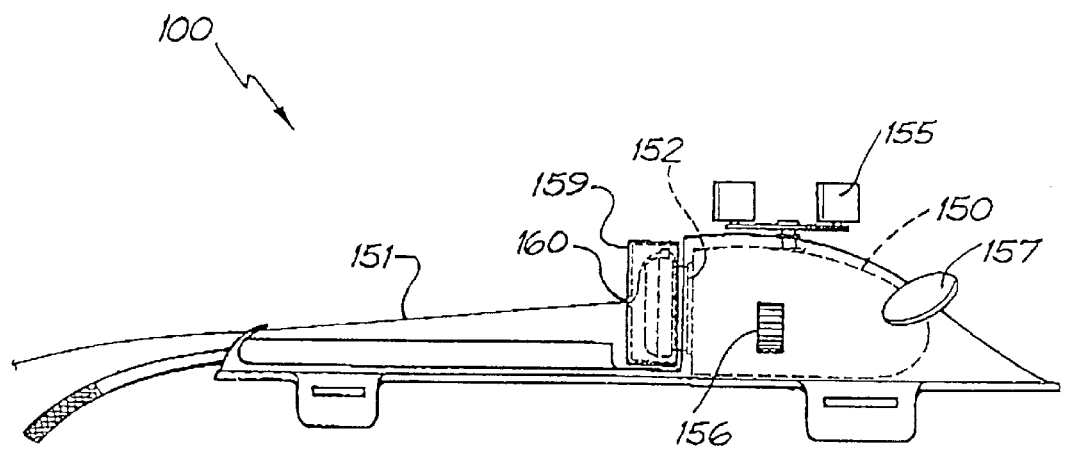
FIG. 8 is a side elevation view of another modified form of the forearm casting device of the first embodiment with the cover removed.

Whilst the body 101 may be configured such that the entire closed face reel 150, is including the closure member, is received in the body 101, as depicted in FIG. 8, the closure member may be removed, with it being functionally replaced by a portion 101c of the body 101 which is adjacent to the hood 153 when the reel 150 is installed and a cover 111 which substantially encloses the closed face reel 150. This configuration is depicted in FIGS. 5 through 7. The inner surface 111a of the cover 111 and the adjacent body portion 101c define with the hood 153 the annular space within which the line guide pin 154 travels to guide the fishing line 151 onto the spool 152. The annular space may be defined by other equivalents to the closure member 159. It may be preferable to retain the original closure member 159, as the end face of the closure member 159, closing off the annular space helps to prevent tangling of the fishing line 151 in the elongated cavity defined by the body 101 and cover 111 when the fishing line is slack, retention of the closure member 159 will also simplify the manufacture of the body 101 and cover 111. If the closure member 159 is retained, the cover 111 need not necessarily be fitted to the body 101.

If fitted, the cover 111 may be formed to include tackle compartments in the sides thereof for storing spare hooks and sinkers and the like.

The closed face reel 150 is preferably provided with a drag system which is adjusted via the drag control 156 to increase or decrease the drag force required to cause the fishing line 151 to gradually unspool as a fish fights. As well as reducing any occurrence of line breakage the drag system will reduce the load on the arm of the operator.

To cast the fishing line 151, the reel release button 157 of the closed face reel 150 is depressed, disengaging the spool 152 from the internal gears of the reel 150 and-retracting the line guide pin 154 into the hood 153, enabling the fishing line to freely unspool, A left hander would typically fit the forearm casting device 100 to his right forearm, press the reel release button 157 with his left hand, take the fishing line 151 in his left hand and hand cast the fishing line 151. Winding the handle 155 re-engages the spool 152 and moves the line guide pin 154 back into the protruding position such that further winding will retrieve the fishing line 151 and, hopefully, a fish on the end thereof. To enable use by both left and right handers it is preferable that the reel 150 is reversible to allow winding of the handle 155 in the preferred direction.

In a variation of the first embodiment as depicted in FIG. 7, the handle 110' is hollow and acts as a guide in place of, or in addition to, the eyelet 104 in guiding the fishing line 151. With the fishing line 151 guided through the hollow handle 110', the hook at the end of the line is kept clear of the body 101 and the operator's hand when the line is retrieved. Guiding the fishing line 151 through the hollow handle 110' also makes it easier for the operator to "feel" the line by supporting the line on an extended forefinger immediately in front of the handle 110'.

What is claimed is:

1. A forearm casting device comprising:
   a body;
   a closed face fishing reel secured to said body towards a first end thereof and having a spool for fishing line, a hood located over said spool, winding means for winding said spool, and a line guide pin displaceable between a retracted position substantially within said hood and a protruding position protruding from said hood for guiding said fishing line onto said spool;
   reel release means for displacing said line guide pin between said protruding and retracted positions;
   securing means for securing said body to a forearm of an operator; and a guide for guiding said fishing line onto and off said closed face fishing reel, said guide being mounted towards an opposite end of said body, whereby, in use, said fishing line extends generally parallel to said forearm towards a hand of said operator and the forefinger of said hand is able to engage said fishing line forward of said guide.

2. The casting device of claim 1 further having a cover substantially enclosing said closed face fishing reel.

3. The casting device of claim 2 wherein said body and said cover define a cavity for said fishing line to extend through said cavity, said guide being an eyelet communicating into said cavity from outside said body and cover.

4. The casting device of claim 3 wherein said cover and a portion of said body adjacent to said hood define with said hood an annular space in which said line guide pin travels as said hood rotates, said cover and an adjacent portion of said body being for preventing said fishing line from slipping over a free end of said line guide pin when said line guide pin is in said protruding position.

5. A casting device of claim 2 wherein said closed face fishing reel includes a closure member substantially enclosing said hood, said closure member defining an annular space with said hood in which said guide pin travels as said hood rotates, said closure member being for preventing said fishing line from slipping over a free end of said line guide pin when said line guide pin is in said protruding position, said closure member having an aperture in an end face thereof for said fishing line to extend through.

6. The casting device of claim 1 and further comprising a handle at said opposite end of said body for gripping by said hand.

7. The casting device of claim 6 wherein said handle is detachable and adjustable in position.

8. The casting device of claim 6 wherein said guide is a hollow in said handle for said fishing line to pass through said hollow of said handle.

9. The casting device of claim 1 wherein said securing means comprises at least one strap for passing from said body around said forearm.

10. The casting device of claim 1 wherein said securing means comprises extensions of opposing sides of said body for partially wrapping around said forearm.

11. The casting device of claim 1 wherein said reel employs a drag system.

12. The casting device of claim 1 wherein said reel release means comprises a reel release button mounted on said body for depressing of said reel release button to displace said line guide pin from said protruding position to said retracted position and locking said line guide pin in said retracted position and subsequent winding of said winding means to displace said line guide pin back to said protruding position.

13. The casting device of claim 1 wherein said winding means is mounted on on a side of the body opposite ot the securing means with a winding axis thereof extending generally has been inserted in its place.

14. The casting device of claim 14 wherein said closed face fishing reel can be reversed for clockwise or anticlockwise winding of said winding means.

15. A forearm casting device having:

a body, a closed face fishing reel secured to said body towards a first end thereof and having a spool, a hood located over said spool, winding means for winding said spool, and a line guide pin displaceable between a retracted position substantially within said hood and a protruding position protruding from said hood for guiding said fishing line onto said spool, said release means for displacing said line guide pin between said protruding and retracted positions, securing means for securing said body to a forearm of an operator, and a guide for guiding fishing line onto and off said fishing reel, wherein said reel release means comprises a reel release button mounted on said body, depressing of said reel release button displacing said line guide pin from said protruding position to said retracted position, and locking said line guide pin in said retracted position, subsequent winding of said winding means displacing said line guide pin back to said protruding position.

16. A forearm casting device having:

a body, a closed face fishing reel secured to said body towards a first end thereof and having a spool, a hood located over said spook winding means for winding said spook and a line guide pin displaceable between a retracted position substantially within said hood and a protruding position protruding from said hood for guiding said fishing line onto said spool, reel release means for displacing said line guide pin between said protruding and retracted positions, securing means for securing said body to a forearm of an operator, and a hollow handle provided at a second end of said body for gripping by said hand and for guiding fishing line onto and off said fishing reel with said fishing line passing through the hollow of said handle, in use.

* * * * *